G. McARTHUR.
Chill-Mold for Wheels.
No. 197,282.  Patented Nov. 20, 1877.
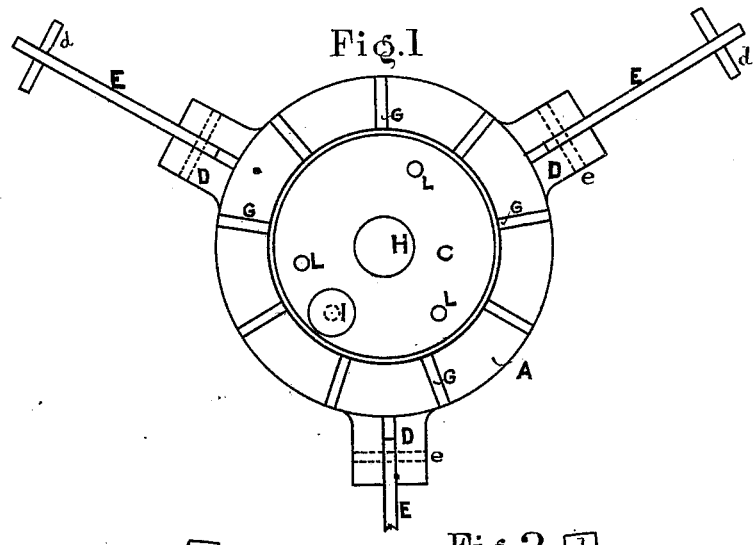
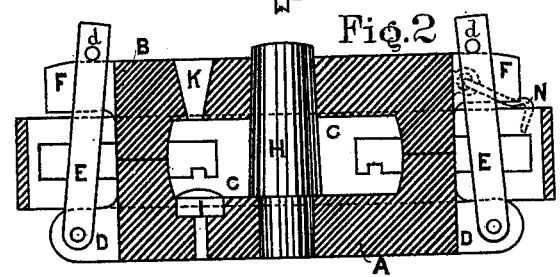
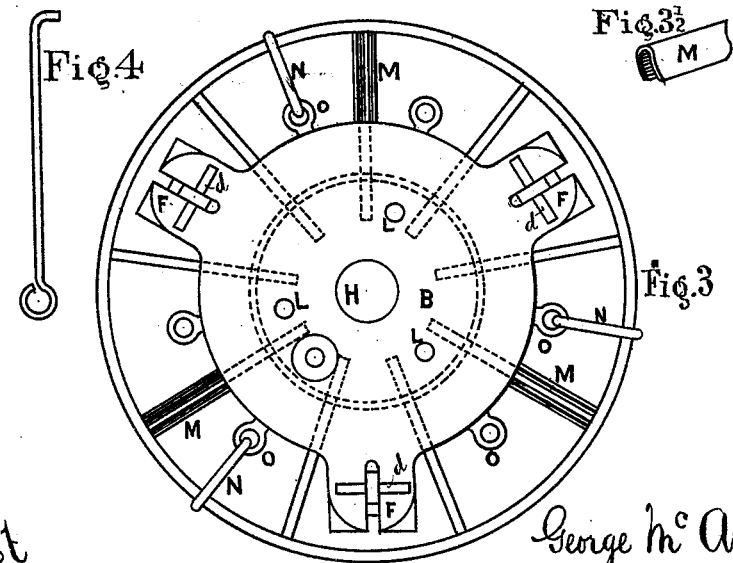
Attest
John Pardy
S. P. Miller
George McArthur
Inventor
George Pardy
Atty

UNITED STATES PATENT OFFICE.

GEORGE McARTHUR, OF SAN LEANDRO, CALIFORNIA.

IMPROVEMENT IN CHILL-MOLDS FOR WHEELS.

Specification forming part of Letters Patent No. 197,282, dated November 20, 1877; application filed August 6, 1877.

*To all whom it may concern:*

Be it known that I, GEORGE MCARTHUR, of San Leandro, Alameda county, California, have invented an Improved Mold for Casting Hubs of Wheels for Wagons, Gang-Plows, &c., of which the following is a specification:

The object of my invention is to facilitate and cheapen the manufacture of carrying-wheels, such as are made with wrought-iron spokes and rims and cast-iron hubs; the invention consisting of a peculiarly-shaped cast-iron mold adapted to casting the hub of a large number of wheels without destroying or injuring the mold.

In the accompanying drawings, Figure 1 is a plan, showing inside of the lower half of the mold with clamping-bars thrown down. Fig. 2 is a sectional elevation of the entire mold clamped together, with the wrought-iron rim and arms of wheel shown in place. Fig. 3 is a plan of mold complete, clamped together ready to cast in. Fig. $3\frac{1}{2}$ is a perspective view of a centering gage-piece, M. Fig. 4 is a view of a lifting-hook—a tool used to raise the upper half of the mold when too hot to handle.

The mold is formed of two heavy circular plates of cast-iron, A and B, similarly shaped and set evenly, one upon the other, a recess or hollow space, C, being formed in the adjoining faces of each plate of such shape and dimensions as will correspond with the hub of the wheel to be cast.

There are lugs D D D cast on the lower half of the mold, between which clamping-bars E E E are pivoted at e e e. These clamping-bars have each a cross-bar, d, firmly secured at nearly the opposite end from the pivotal point of the bar. These clamping-bars swing in between the lugs F F F, cast on the upper half of the mold, the upper face of these lugs being slightly beveled off, so that when the clamping-bars E are swung in between the lugs F, the cross-bars d will, by being forced up the inclined surfaces of the lugs, firmly draw together the upper and lower half of the mold.

Around the annular rims, facing together, of the upper and lower half of the mold, recesses G G G are cut, in which the arms of the wheel set, half the recess being cut in the upper and half in the lower part of the mold.

H, Figs. 1, 2, and 3, is the core which forms the eye of the wheel. It fits easily in a recess provided for it in the center of lower half of the mold. It is made of steel, and polished smooth, so that the casting will not stick to it. It may also have a slight taper to facilitate its withdrawal after the casting is set.

I, Figs. 1 and 2, is a steel button, set in a recess in the lower half of the mold, directly under the hole K in the upper half of the mold, through which the hot metal is forced. The metal, falling on this button, which has a convex surface, does not injure the mold, which was found to be the case when the button was dispensed with, for the hot metal continually poured upon one spot is found to wear a cavity, and in a little while the casting will be liable to stick to the mold at the spot the hot metal is poured upon.

Should this steel button stick to the casting, no harm is done, for it withdraws from the mold with the casting, and may be easily parted from the casting with a slight tap of a hammer.

L L L are sand cores, which core bolt-holes in the hub of the wheel, not necessary in all cases, but used in the wheel herein illustrated. These sand cores should fit in the holes in the mold made to receive them somewhat loosely, so that a sufficient ventage may be left for the gases to pass off.

M M M, Fig. 3, are gage-pieces, which are simply small pieces of sheet-iron bent in form of the letter U, and represent the exact distance between the side of the mold and the inside of the rim of the wheel. They are hung on the arms of the wheel in three or four places. Thus the wheel is regulated in a central position.

N N N are hooks pendent from the eye-bolts O O O, projecting from the upper half of the mold. When the mold is closed, these hooks are hooked over the rim of the wheel, and assist in holding the wheel firm and immovable.

The operation of molding and casting is simple, and as follows: The wrought-iron skeleton of the wheel is rested in the lower half of the mold, each arm fitting in its corresponding recess in the annular rim. The mandrel H and sand cores L L L being put in place, the upper half of the mold is lifted on, the gage-pieces M placed on three or four arms, centering the wheel with the mold. The hooks N are then hooked over the rim of the wheel, and the mold is firmly clamped together. The metal may then be poured into the mold.

The operation, in most cases, may be repeated every ten minutes.

What I claim as my invention, and desire to secure by Letters Patent, is as follows:

A mold consisting of the two metal disks A and B, provided with the recesses C, slots G G, and mandrel H, the two disks being clamped together by the clamping device, consisting of the irons E E, pivoted to the lugs on one disk at $e$ $e$, and engaging with the lugs F F on the other disk, as herein described, and for the purpose set forth.

GEORGE McARTHUR.

Witnesses:
GEO. PARDY,
JNO. PARDY.